United States Patent [19]

Kilty

[11] 4,337,386
[45] Jun. 29, 1982

[54] WELDER CONTROL

[75] Inventor: Alan L. Kilty, Peoria, Ill.

[73] Assignee: Caterpillar Tractor Co., Peoria, Ill.

[21] Appl. No.: 113,989

[22] Filed: Jan. 21, 1980

[51] Int. Cl.³ .............................................. B23K 9/10
[52] U.S. Cl. ............................ 219/130.21; 219/130.31
[58] Field of Search ...................... 219/130.21, 130.31, 219/69 C; 323/19, 22 R

[56] References Cited

U.S. PATENT DOCUMENTS 3,987,271 10/1976 Bell, Jr. et al. ................... 219/69 C

OTHER PUBLICATIONS

Hobart Instruction Sheet TM-667, 10/78.

Primary Examiner—C. C. Shaw
Attorney, Agent, or Firm—Wegner, Stellman, McCord, Wood & Dalton

[57] ABSTRACT

An automatic welder control 10 for direct and reverse polarity welding has an analog signal control circuit with an isolator 34 connected therein. This prevents the establishment of a circulating current path from the welder power drive circuit 14 through the signal circuit.

5 Claims, 4 Drawing Figures

WELDER CONTROL

DESCRIPTION

Technical Field

This invention relates generally to an automatic control for a welder and more particularly to such a control in which the polarity of the welding current to the welding gun and workpiece can be reversed without damage to the control circuit.

Background Art

In an automatic welding system, often referred to as a robot control, a control signal source provides an analog control signal to a power drive circuit which has positive and negative current outputs one connected to the welding gun and the other to the workpiece. The analog control signal and a feedback signal from the power drive circuit are connected with an error amplifier which has an output connected with and controlling the power drive circuit. In usual operation of the welding system, the positive output of the power drive circuit is connected with a grounded workpiece and the negative output is connected with the weld gun. The positive output of the drive circuit is also connected with the common signal reference for the error amplifier which is isolated from the signal source and welder ground. It is sometimes desirable to reverse the polarity of the welding potentials, connecting the weld gun with the positive output and the grounded workpiece with the negative output. With this connection a current path is established from the power drive circuit output through ground and the common signal connection with the signal source. A high amplitude circulating current is established which burns out the weakest link in the circuit, generally the common signal connection between the power drive circuit and the error amplifier.

The present invention is directed to overcoming one or more of the problems as set forth above.

Disclosure of the Invention

In one aspect of the present invention, an analog signal isolator is connected between the analog signal source and the input of the error amplifier, preventing the establishment of a circulating current path from the power drive circuit output through the signal circuit and ground.

In another aspect of the invention, signal sensing circuits are connected with the weld gun and workpiece to provide feedback signals to the error amplifier. A Zener diode connected in the signal sensing circuit provides a fixed feedback signal in the event a sensing cable is broken or disconnected. An inverting amplifier is connected in the circuit of the positive signal sensor to afford control for the losses in the cable connected with power drive output.

BEST MODE FOR CARRYING OUT THE INVENTION

Figure 1:
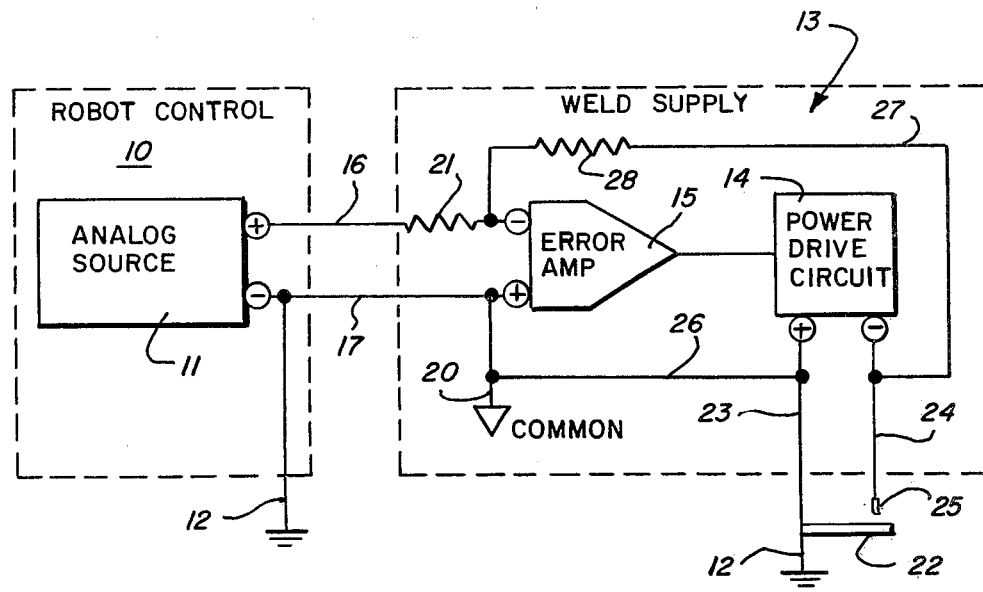
FIG. 1 is a schematic drawing illustrating a prior art welding control connected for operation in a first or direct mode.
Figure 2:
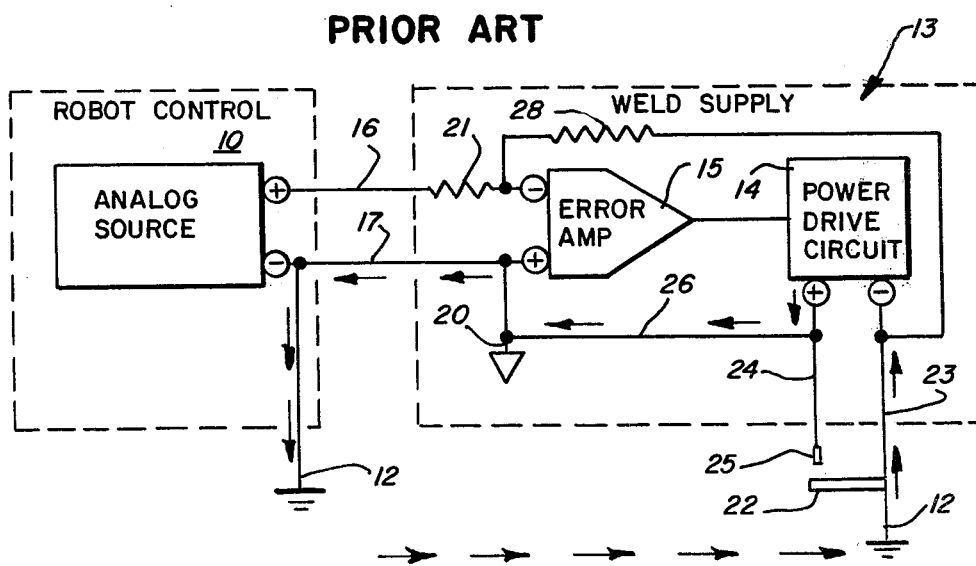
FIG. 2 is a schematic drawing of the prior art welder control connected for operation in a second or reverse mode.

The significance of the invention can best be appreciated from a consideration of the prior art circuits of FIGS. 1 and 2 which illustrate the problem. In FIG. 1 a welder control 10 includes an analog control signal source 11 with positive and negative signal output terminals. The negative output terminal is connected with a suitable reference as earth ground 12. The welder control may, for example, have several welding programs stored in digital form. Included in the control is a digital to analog converter which generates the analog control signal for the selected welding program. Details of the control are not a part of the invention and are not shown.

The weld current supply 13 includes a power drive circuit 14 controlled by an error amplifier 15 having direct and inverse inputs designated plus and minus, respectively. The control signal from source 11 is connected through lines 16, 17 with the input terminals of error amplifier 15. The direct input is connected with the grounded negative terminal of the analog source and is also connected with a common signal reference 20 in the weld supply 13 which is isolated from earth ground 12 except for the connection with the signal source. A input resistor 21 is connected in series with signal line 16. The output of error amplifier 15 is connected with a control input of the power drive circuit 14. The positive output of power drive circuit 14 is connected with a grounded workpiece 22 through cable 23. The negative output of the power drive circuit is connected through cable 24 with weld gun 25. The positive output is also returned through a common signal connection 26 to the common signal reference 20 and direct input of error amplifier 15. This connection provides a reference for a feedback circuit 27 through feedback resistor 28 to the inverse input terminal of error amplifier 15.

The error amplifier responds to the analog control signal and provides an appropriate control for the power drive signal. The feedback circuit stabilizes the system so that the power drive circuit output accurately follows the control signal.

In some welding procedures it is desirable to reverse the polarity of the workpiece and weld gun. Typically this is done by reversing the connections of the cables to the output of the power drive circuit. FIG. 2 illustrates the prior art circuit connected for the reverse polarity mode of operation. Elements identified in FIG. 1 are identified in FIG. 2 by the same reference numerals but are not all specifically described herein.

The significant difference in the two modes of operation is that cable 23 and the grounded workpiece 22 are connected with the negative output of power drive circuit 14 while cable 24 and weld gun 25 are connected with the positive output. For safety reasons, both the analog signal source 11 and the workpiece 22 are connected with earth ground 12 while the common signal reference 20 in weld supply 13 is isolated from the only indirectly connected with the earth ground. This results in the establishment of a circuit for a circulating current indicated by arrows in FIG. 2. The circuit may be traced from the positive output of the power drive circuit through common signal connection 26, signal connector 17 to the analog signal source, earth ground 12, workpiece 22 and cable 23. This circuit has a low resistance and carries a high amplitude current from the power drive circuit. The heating effect of the current causes a circuit failure, generally in the common signal connection 26 of the weld supply, rendering the supply inoperative.

Figure 3:
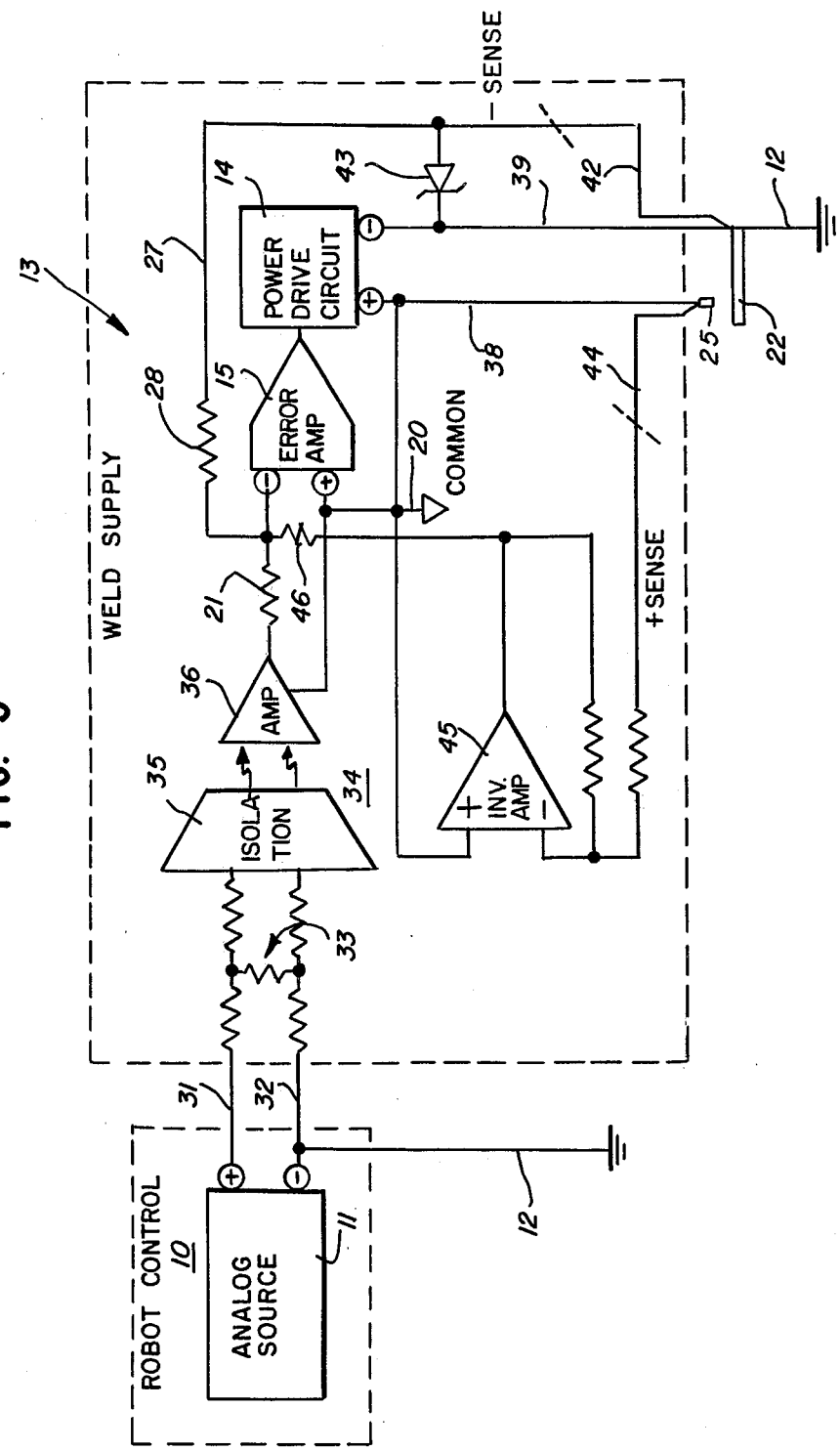
FIG. 3 is a schematic drawing of an embodiment of the invention connected for operation in the reverse mode.

The circuit of FIG. 3 illustrates a preferred form of the invention connected for the second or reverse mode of operation. Again, elements which are common with elements of the systems of FIGS. 1 and 2 will be identified by the same reference numerals. The output control signal from analog signal source 11 of welder control 10 is connected through lines 31, 32 and resistive network 33 with an analog signal isolator 34, which may, for example, be an opto-isolator unit. This unit includes an optical transmitter 35 which has a light output responsive to the analog signal input from signal source 11. The modulated light is directed to a photosensitive receiver 36, as a phototransistor amplifier. The output of receiver 36 is a signal corresponding with the analog control signal from source 11 and is connected with error amplifier 15 through input resistor 21. As in FIG. 2, for the reverse polarity mode of operation, the positive output of drive circuit 14 is connected through cable 38 with weld gun 25 while the negative terminal is connected through cable 39 with grounded workpiece 22. The incorporation of analog signal isolator 34 in the signal connection between the analog signal source 11 and error amplifier 15 eliminates the DC connection between the weld supply common signal reference 20 and earth ground 12. Accordingly, there is no circuit for a circulating current from the power drive circuit through earth ground and the problem encountered with the welder control of FIG. 2 is eliminated.

The control of FIG. 3 further incorporates remote sensing of the output of the power drive circuit 14 at the workpiece 22 and weld gun 25. This provides compensation of the power drive circuit for the voltage drops in cables 38, 39 and ensures that the welding voltage accurately follows the control signal from analog source 11. The negative sensing circuit 42 is connected from the workpiece with the feedback circuit 27, 28. A Zener diode 43 is connected from sensing circuit 42 to the negative output of power drive circuit 14. In the event the negative sensing circuit 42 is disconnected from the workpiece or broken, a negative feedback potential from the drive circuit output is coupled through Zener diode 43 to the inverse input of error amplifier 15.

The positive sensing circuit 44 is connected from the weld gun 25 through an inverting amplifier 45 and input resistor 46 with the inverse input of error amplifier 15. The direct or reference input of inverting amplifier 45 is returned to the common signal reference 20. The positive sensing circuit adds to the input of the error amplifier a signal based on the voltage drop through cable 38, boosting the output to compensate for this loss.

Figure 4:
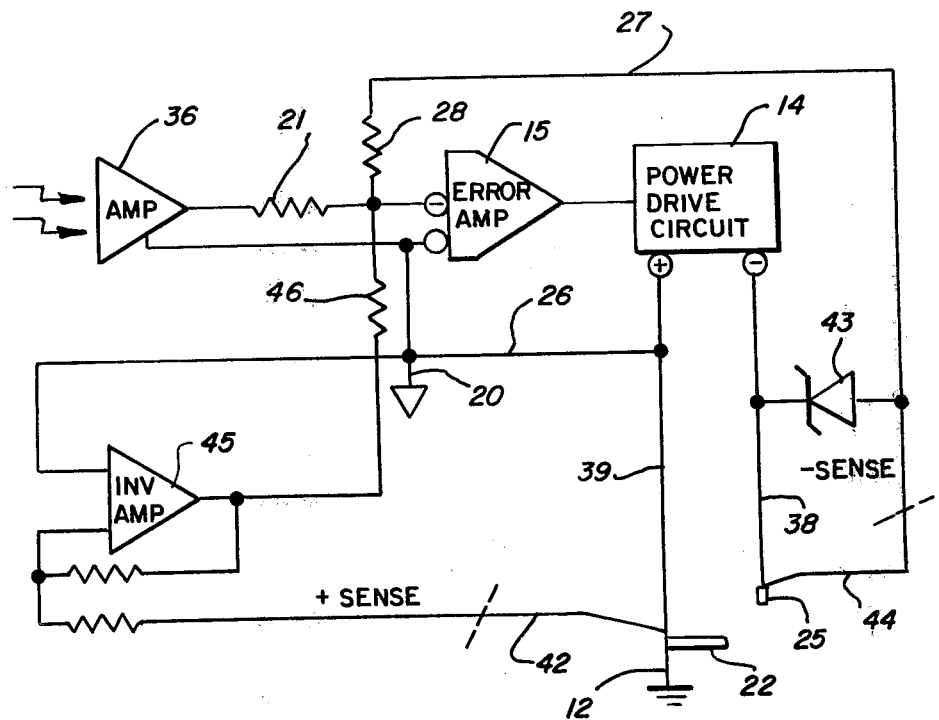
FIG. 4 is a partial schematic of the welder control of FIG. 3 connected for operation in the direct mode.

FIG. 4 illustrates the connection of the cables and signal sensing circuits of FIG. 3 in the first or direct mode of operation. Again, the reference numerals assigned in FIG. 3 are used. The signal sensing circuit connected with workpiece 22 is in this case connected with the positive sensing circuit and through inverting amplifier 45 with error amplifier 15. The signal sensing circuit 44 connected with weld gun 25 is connected through the negative feedback circuit 27 with the error amplifier. The signal sensing circuits 42, 44 are preferably connected with the respective feedback circuitry through a two-pole, double-throw reversing switch (not shown) connected in the circuit at the points indicated by the dashed lines. This minimizes the conductor reconnection which is necessary when cables 38, 39 are reconnected to convert between the direct and reverse polarity welding.

Industrial Applicability

The improved welder control with an analog signal isolator connected between the signal source and the signal input of the weld supply may be used in welding situations where it is desirable to have the convenience of an automatic control in systems where it is necessary to use reverse polarity welding.

I claim:
1. In an automatic control for a welder having
   a controlled power drive circuit 14 with positive and negative outputs,
   a source of analog control signal 11 referred to ground 12,
   an error amplifier 15 isolated from ground having signal inputs connected with said analog control signal source 11 and an output connected with said power drive circuit 14,
   a common signal connection 20,26 between the positive output of the power drive circuit and one of the inputs of said error amplifier, said common signal connection being isolated from the control signal ground reference 12,
   said welder control having a first operating mode in which the positive power drive output is connected with a grounded workpiece 22 and the negative power drive output is connected with a welding gun 25 and a second operating mode in which the positive power drive output is connected with the welding gun 25 and the negative power drive output is connected with the grounded workpiece 22, the improvement comprising:
   an analog signal isolator 34 connected between said analog signal source 11 and the input of said error amplifier 15, said isolator coupling the analog control signal from said source to said error amplifier and blocking a circulating current from said power drive circuit through the common signal connection 20,26 and ground 12 in said second operating mode;
   a signal feedback circuit with sensing circuits 42,44 connected from said workpiece 22 and said welding gun 25 to said error amplifier 15; and
   a Zener diode 43 connected between the negative output of said power drive circuit and the sensing circuit connected therewith for providing a feedback signal in the event the sensing circuit connection is interrupted.

2. In an automatic control for a welder having a controlled power drive circuit 14 with positive and negative outputs one connected with a grounded workpiece 22 and the other with an ungrounded welding gun 25, said control including a source 11 of analog control signal referred to ground 12 and an error amplifier 15 isolated from ground, said error amplifier having signal inputs connected with said analog source and an output connected with said power drive circuit, the improvement comprising:
   an analog signal isolator 34 connected between said analog signal source 11 and the input of said error amplifier 15 to prevent the establishment of a circulating current path from said power drive circuit output 14 through the signal circuit and ground 12, said error amplifier 15 having one input terminal connected with a common signal reference 20 isolated from ground, one output terminal of said power drive circuits being connected with said signal reference;

sensing circuits 42,44 connected from said workpiece 22 and welding gun 25 to said error amplifier 15; and a Zener diode 43 connected between the drive circuit output terminal which is not connected with the signal reference and the sensing circuit connected therewith to provide a feedback signal to the error amplifier in the event the sensing circuit connection is broken.

3. In an automatic control for a welder having a controlled power drive circuit 14 with positive and negative outputs, a source of analog control signal 11 referred to ground 12, an error amplifier 15 isolated from ground having signal inputs connected with said analog control signal source 11 and an output connected with said power drive circuit 14, a common signal connection 20,26 between the positive output of the power drive circuit and one of the inputs of said error amplifier, said common signal connection being isolated from the control signal ground reference 12, said welder control having a first operating mode in which the positive power drive output is connected with a grounded workpiece 22 and the negative power drive output is connected with a welding gun 25 and a second operating mode in which the positive power drive output is connected with the welding gun 25 and the negative power drive output is connected with the grounded workpiece 22, the improvement comprising:

an analog signal isolator 34 connected between said analog signal source 11 and the input of said error amplifier 15, said isolator coupling the analog control signal from said source to said error amplifier and blocking a circulating current from said power drive circuit through the common signal connection 20,26 and ground 12 in said second operating mode;

a signal feedback circuit with sensing circuits 42,44 connected from said workpiece and said welding gun to said error amplifier;

a Zener diode 43 connected between the negative output of said power drive circuit and the sensing circuit connected therewith for providing a feedback signal in the event the sensing circuit connection is interrupted; and an inverter amplifier 45 connected in the sensing circuit which is connected with the positive output of said power drive circuit.

4. In an automatic control for a welder having a controlled power drive circuit 14 with positive and negative outputs, a source of analog control signal 11 referred to ground 12, an error amplifier 15 isolated from ground having signal inputs connected with said analog control signal source 11 and an output connected with said power drive circuit 14, a common signal connection 20,26 between the positive output of the power drive circuit and one of the inputs of said error amplifier, said common signal connection being isolated from the control signal ground reference 12, said welder control having a first operating mode in which the positive power drive output is connected with a grounded workpiece 22 and the negative power drive output is connected with a welding gun 25 and a second operating mode in which the positive power drive output is connected with the welding gun 25 and the negative power drive output is connected with the grounded workpiece 22, the improvement comprising:

an analog signal isolator 34 connected between said analog signal source 11 and the input of said error amplifier 15, said isolator coupling the analog control signal from said source to said error amplifier and blocking a circulating current from said power drive circuit through the common signal connection 20,26 and ground 12 in said second operating mode;

a signal feedback circuit with sensing circuits 42,44 connected from said workpiece 22 and said welding gun 25 to said error amplifier 15;

a Zener diode 43 connected between the negative output of said power drive circuit and the sensing circuit connected therewith for providing a feedback signal in the event the sensing circuit connection is interrupted;

said error amplifier 15 having direct and inverse inputs, one being connected with said common signal reference 20, and the other having connected thereto the analog signal and feedback circuits.

5. In an automatic control for a welder having a controlled power drive circuit 14 with positive and negative outputs, one connected with a grounded workpiece 22 and the other with an ungrounded welding gun 25, said control including a source 11 of analog control signal referred to ground 12 and an error amplifier 15 isolated from ground, said error amplifier having signal inputs connected with said analog source and an output connected with said power drive circuit, the improvement comprising:

a signal feedback circuit with sensing circuits 42,44 connected from said workpiece 22 and said welding gun 25 to said error amplifier 15; and a Zener diode 43 connected between the negative output of said power drive circuit and the sensing circuit connected therewith for providing a feedback signal in the event the sensing circuit connection is interrupted.

* * * * *